Patented Dec. 5, 1944

2,364,587

UNITED STATES PATENT OFFICE 2,364,587

STABILIZATION OF HALOBUTENES

Rupert C. Morris, Berkeley, and Edward C. Shokal, Oakland, Calif., assignors to Shell Development Company, San Francisco, Calif., a corporation of Delaware No Drawing. Application February 8, 1943, Serial No. 475,209

9 Claims. (Cl. 260—652.5)

This invention relates to a method for preventing or inhibiting the decomposition of the halobutenes which contain a halogen atom linked to an unsaturated carbon atom under conditions encountered during their transportation and storage. The invention also pertains to the stabilized halobutene compositions resulting from the application of such method.

The marked tendency of the halobutenes which contains a halogen atom linked to an unsaturated carbon atom, particularly 2-chlorobutene-2, to undergo decomposition during shipment and storage, particularly in the presence of small amounts of water, has been long recognized. While in general this tendency is most pronounced in metal containers, as copper or ferruginous containers, in many cases extensive decomposition may occur in glass as well. The decomposition whether occurring in glass or in metal imparts undesirable characteristics as bad odor and objectionable color to the packaged liquid which adversely affect its salability. In the case of metal containers the problem may be twofold since substantial corrosion of the walls of the container may result.

The various inhibitors which have heretofore been proposed to suppress the deterioration of organic halides during shipment and storage while in some instances fairly effective are in general unsuitable for the stabilization of the halobutenes which contain a halogen atom linked to an unsaturated carbon atom either because of the large quantity of inhibitor which must be added or because of difficulties encountered in separating the inhibitor, when necessary, after it has served its purpose.

It has now been found that the deterioration of the halobutenes which contain a halogen atom linked to an unsaturated carbon atom, and particularly those, such as 2-chlorobutene-2, wherein the olefinic linkage is in the 2-position, under ordinary conditions of shipment and storage, may be effectively suppressed by mixing therewith a small amount of lime slurry. The lime slurry may consist of from about 2 to about 60 percent by weight of lime (calcium oxide), but it is preferred to employ a lime slurry which contains between about 5 and about 15 percent lime. The discovery that lime slurry has the property of preserving halobutenes of the class described against deterioration is surprising since a solution of calcium oxide is ineffective. Also, solutions of sodium and potassium hydroxide are without value when employed in the stabilization of this group of organic halides, a tarry deposit soon forming in the stored liquid.

The method of stabilizing halobutenes provided by the invention is applicable irrespective of the type of container in which the liquid is packaged, but is especially valuable in connection with the shipment and/or storage of these organic halides in ferruginous containers.

The invention is applicable to the stabilization of the halobutenes which contain a halogen atom linked to an unsaturated carbon atom. The olefinic linkage in the halobutene may be between the first and second carbon atoms (1 or alpha position), or it may be between the second and third carbon atoms (2 or beta position). The invention is of particular value and usefulness as applied to the stabilization of 2-chlorobutene-2 and the other 2-halobutenes wherein the olefinic linkage is in the two position. Such halobutenes may contain one or a plurality of halogen atoms linked to the unsaturated carbon atom or carbon atoms, and one or a plurality of halogen atoms may also be linked to saturated carbon atoms. The halogen atom or atoms present in the halobutene may be fluorine, chlorine, bromine or iodine. Representative halobutenes which may be stabilized in accordance with the invention are: 2-chlorobutene-2, 2-bromobutene-2, 2-iodobutene-2, 1,2-dichlorobutene-2, 2,3-dichlorobutene-2, 2,3-dibromobutene-2, 1,2,3-trichlorobutene-2, 1,2,4-trichlorobutene-2, 2-chlorobutene-1, 2-bromobutene-1, 1-chlorobutene-1, 2,3-dichlorobutene-1, 1-bromobutene-1, 2-iodobutene-1, 1,2-dichlorobutene-1 and 1,2,3-trichlorobutene-1.

Although the proportion or amount of lime slurry which is added to suppress the decomposition of halobutenes according to the invention and to produce the novel compositions of matter encompassed thereby may vary within wide limits, it is preferred to add the smallest effective amount. This is usually between about 0.1% and about 5% by volume, depending inter alia upon the degree of instability of the particular halide being prepared for shipment or storage, the period over which the halide must be preserved, and the strength of the slurry which is being used.

The present invention has been found especially useful as a means of stabilizing 2-chlorobutene-2, large amounts of which are produced as a by-product during the synthesis of butadiene from dichlorobutene. 2-chlorobutene-2 is useful, for example, as an ingredient in paint remover, and as a degreasing and extraction solvent.

When it is first recovered or prepared 2-chlorobutene-2 usually is clear and substantially water-white, and it has a sweet odor and does not give off hydrogen chloride fumes. However, when stored for even a relatively short period of time in glass containers the liquid develops a deep yellow color and has a sharp disagreeable odor. Storage in ferruginous containers displays its decomposition even more prominently, i. e. it becomes nearly black and a tarry deposit forms on the sides of the container.

The suitability of lime slurry in the stabilization of 2-chlorobutene-2 is illustrated by the following example, it being understood that the practice of the invention is not limited to the stabilization of this particular halobutene.

*Example*

A ½ gallon sample of freshly prepared 2-chlorobutene-2 to which had been added about 1% by volume of 10% lime slurry was poured into a standard one-gallon shipping drum which was placed on the laboratory roof exposed to the elements. After 10 months the liquid was perfectly clear and there was only a very light deposit on the walls of the container. The slurry had settled out on the bottom of the drum. The Gardner color scale reading on the liquid was <1. On the Gardner scale No. 1 is practically water-white, while No. 15 is dark brown.

We claim as our invention:

1. The method of stabilizing 2-chlorobutene-2 which comprises adding thereto about 1% by volume of 10% lime slurry.

2. The method of preventing the decomposition of 2-chlorobutene-2 which comprises adding thereto a stabilizing amount of lime slurry containing from about 5 to about 15% lime.

3. As a composition of matter 2-chlorobutene-2 to which has been added a stabilizing quantity of a lime slurry containing from about 5 to about 15% lime.

4. A method for preventing the decomposition of a 2-halobutene in which the olefinic linkage is in the 2-position which comprises adding thereto a stabilizing amount of a lime slurry containing from about 2 to about 60% lime.

5. As a composition of matter a 2-halobutene in which the olefinic linkage is in the 2-position to which has been added a stabilizing quantity of a lime slurry containing from about 2 to about 60% lime.

6. The method of preventing the decomposition of a mono-halobutene in which the halogen atom is linked to an unsaturated carbon atom which comprises adding thereto a stabilizing amount of a lime slurry containing from about 2 to about 60% lime.

7. A composition of matter comprising a mono-halobutene in which the halogen atom is linked to an unsaturated carbon atom and a stabilizing quantity of a lime slurry containing from about 2 to about 60% lime.

8. The method of preventing the decomposition of a halobutene containing a halogen atom linked to an unsaturated carbon atom which comprises adding thereto a stabilizing amount of a lime slurry.

9. A composition of matter comprising a halobutene containing a halogen atom linked to an unsaturated carbon atom and a stabilizing quantity of a lime slurry.

RUPERT C. MORRIS.
EDWARD C. SHOKAL.